(12) United States Patent
Benesch et al.

(10) Patent No.: US 9,543,848 B2
(45) Date of Patent: Jan. 10, 2017

(54) ACTIVATION CIRCUIT OF A RESONANCE CONVERTER

(71) Applicant: Siemens Aktiengesellschaft, Munich (DE)

(72) Inventors: Karl Benesch, Waidhofen/Ybbs (AT); Janusz Dyszewski, Vienna (AT); Stefan Reschenauer, Atzelsdorf (AT)

(73) Assignee: Siemens Aktiengesellschaft, Munich (DE)

( * ) Notice: Subject to any disclaimer, the term of this patent is extended or adjusted under 35 U.S.C. 154(b) by 36 days.

(21) Appl. No.: 14/724,251

(22) Filed: May 28, 2015

(65) Prior Publication Data

US 2015/0381059 A1 Dec. 31, 2015

(30) Foreign Application Priority Data

Jun. 25, 2014 (EP) .................................... 14173928

(51) Int. Cl.
*H02M 3/335* (2006.01)
*H02M 1/08* (2006.01)
*H02M 1/38* (2007.01)
*H02M 7/538* (2007.01)
*H02M 7/48* (2007.01)

(52) U.S. Cl.
CPC ........... *H02M 3/33546* (2013.01); *H02M 1/08* (2013.01); *H02M 1/38* (2013.01); *H02M 7/538* (2013.01); *H02M 2007/4815* (2013.01); *Y02B 70/1441* (2013.01)

(58) Field of Classification Search
CPC .... H02M 3/33546; H02M 7/538; H02M 1/38; H02M 1/08; H02M 2007/4815; Y02B 70/1441

USPC .................................................... 363/21.02
See application file for complete search history.

(56) References Cited

U.S. PATENT DOCUMENTS

| 4,937,470 | A | | 6/1990 | Zeiler | |
|---|---|---|---|---|---|
| 5,663,876 | A | * | 9/1997 | Newton | H02M 7/06 363/126 |
| 7,285,875 | B2 | * | 10/2007 | Yasumura | H02M 3/337 307/127 |
| 7,388,760 | B2 | * | 6/2008 | Yasumura | H02M 1/10 363/132 |

(Continued)

OTHER PUBLICATIONS

Search report from EIC 2800 STIC searcher Benjamin Martin dated on Jun. 29, 2016.*

(Continued)

*Primary Examiner* — Timothy J Dole
*Assistant Examiner* — Htet Z Kyaw
(74) *Attorney, Agent, or Firm* — Cozen O'Connor

(57) ABSTRACT

An activation circuit for activating a power bridge circuit of a resonance converter, including an inductive activation transformer that transfers a pulsed control signal generated via a CMOS driver to the power bridge circuit, wherein a clamping circuit is arranged at the output of each CMOS driver, where the clamping circuit clamps a primary winding of the activation transformer to a ground potential during the dead time between two pulses of the pulsed control signal such that overvoltages, which otherwise arise when switching the activation transformer inductance, are thus clamped during a dead time and a circuit breaker switches off securely.

12 Claims, 2 Drawing Sheets

(56) References Cited

U.S. PATENT DOCUMENTS

| | | | |
|---|---|---|---|
| 8,520,420 B2* | 8/2013 | Jungreis | H02M 3/3376 363/17 |
| 8,681,512 B2* | 3/2014 | Westmoreland | H02M 1/34 363/132 |
| 9,083,256 B2* | 7/2015 | Crewson | H02M 3/3376 |
| 9,270,158 B2* | 2/2016 | Duan | H02M 1/08 |
| 2004/0047164 A1 | 3/2004 | Brkovic | |
| 2014/0140102 A1 | 5/2014 | Duan et al. | |
| 2015/0318851 A1* | 11/2015 | Roberts | H01L 25/18 327/109 |

OTHER PUBLICATIONS

Biswas S. K. et al., "Gate drive methods for IGBTs bridge configurations"; Industry Applications Society Annual Meeting, 1994, Conference Record of the 1994 IEEE Denver, Co. USA Oct. 2-6, 1994, pp. 1310-1316; ISBN: 978-0-7803-1993-6; DOI: 10.1109/ IAS 1994; US; Oct. 2, 1994.

Hässig H. R. et al.; Zuverlässiger Betrieb von MOSFETs in Brückenschaltungen; Elektronik, WEKA Fachzeitschriften-Verlag GmbH; vol. 38; No. 10; pp. 55-56, 58-63; ISSN: 0013-5658; XP000071433; 1989; DE; May 12, 1989.

\* cited by examiner

ACTIVATION CIRCUIT OF A RESONANCE CONVERTER

BACKGROUND OF THE INVENTION

1. Field of the Invention

The invention relates to an activation circuit for activating a power bridge circuit of a resonance converter, which includes an inductive activation transformer that transfers a pulsed control signal generated via a CMOS driver to the power bridge circuit.

2. Description of the Related Art

Resonance converters function without pulse-width modulated (PWM) control. The power bridge circuit is always activated with a full pulse duty factor, where the switching frequency determines the transformation ratio and thus the output voltage.

In order to activate the power bridge circuit in the high voltage range, an inductive activation transformer is required to galvanically separate the control circuit from the power circuit. This activation transformer transfers a control signal to switch the circuit breaker arranged in the power bridge circuit.

The control signal is generally generated by CMOS drivers. Here, the control signal is a sequence of alternating positive and negative pulses with, in each instance, dead times occurring therebetween. The dead time between the pulses of the control signal provides for switching in the case of a zero voltage (Zero Voltage Switching (ZVS)) and protects the circuit breaker from a simultaneous switching-through. Otherwise a short-circuit would result.

A CMOS driver involves two MOSFETs connected in series, where the first MOSFET pulls the CMOS driver output towards a supply voltage and the second MOSFET pulls the CMOS driver output towards a ground potential.

In order to activate a bridge circuit via an activation transformer, two CMOS drivers are required. Their outputs are connected in such cases by a primary winding of the activation transformer. The activation transformer comprises two secondary windings on the secondary side, which are wound mirror-inverted. The pulses that can be tapped on the secondary windings are thus likewise opposite, in other words, a gate pulse is positive, while the gate pulse present on the other secondary winding is negative, and the gate pulse is negative while the gate pulse present on the other secondary winding is positive.

In the case of a switching cycle, the CMOS drivers are switched during a first pulse such that a current flows through the primary winding. For instance, the first MOSFET of the first CMOS driver switches its output to the supply voltage and the second MOSFET of the second CMOS driver switches its output to the ground potential. At the end of this first pulse, all MOSFETs switch off for the predetermined dead time. The second MOSFET of the first CMOS driver then switches its output to the first ground potential during a second pulse, and the first MOSFET of the second CMOS driver switches its output to the supply voltage so that the current flows through the primary winding in the other direction.

In most instances, CMOS drivers are optimized for a direct activation without activation transformers. They are therefore not well suited to driving inductive transformers. An overdimensioning of the CMOS driver in most instances helps. Such a measure is however generally not economical.

Problems arise in particular due to the dead time, during which energy flows from the power bridge circuit back to the CMOS drivers via the activation transformer. With inadequate dimensioning of the CMOS drivers, it may occur that the circuit breakers do not correctly block and that an excessively high gate residual voltage is present as a result of an upright energy flow.

This problem is preferred on account of leakage currents and unfavorable states, such as high temperatures, as a result of which this may finally result in the simultaneous through-switching of the power bridge circuit, which often ends in damage to the circuit on account of a short-circuit.

A further problem consists in a high impedance of the CMOS driver circuit, because two CMOS drivers are connected in series. Oscillations may occur here during switching, which negatively affect the electromagnetic compatibility (EMC).

SUMMARY OF THE INVENTION

It is therefore an object of the invention to provide an improved activation circuit for actuating a power bridge circuit of a resonance converter.

This and other objects and advantages are achieved in accordance with the invention by providing an activation circuit in which a clamping circuit is arranged at the output of each CMOS driver, where the clamping circuit clamps a primary winding of the activation transformer to a ground potential during a dead time between two pulses of the control signal. Overvoltages, which otherwise arise when switching the activation transformer inductance, are thus clamped during a dead time and the circuit breaker switches off securely. The CMOS drivers are also discharged on account of smaller losses. The output of a CMOS driver is namely pulled via the assigned clamping circuit toward the ground potential during a switching period half. Moreover, dead time pulses do not have an impact on the CMOS driver switch, but are instead short-circuited by the clamping circuit.

The inventive measure allows for the use of simple and cost-effectively integrated CMOS drivers, as a result of which the resonance converter can be manufactured more cost-effectively as a device and with a smaller installation size. In this way, the distance between the CMOS modules and the activation transformer compared with conventional activation circuits is less critical because the clamping circuits are arranged directly at the input of the activation transformer.

The EMC problem is also mitigated because high-frequency oscillations are reduced when the circuit breaker is switched on and off.

This solution is particularly effective if the power bridge circuit operates in the high voltage range, because an imminent short-circuit would then be all the more problematic on account of the high voltages.

A simple version of the invention provides that each clamping circuit includes a blocking element, which is arranged in the connecting line between the output of the assigned CMOS driver and a terminal of the primary winding of the activation transformer, that this connecting line is connected to the ground potential via a switching element and that the switching element is activated via a flux voltage that is dropping on the blocking element in the conducting state. As a result, the switching element is switched off with a conducting blocking element. A simple activation of the respective clamping circuit is provided in this way, which is derived directly from the switching states of the CMOS driver.

Here, it is advantageous if a limiting element for limiting a negative voltage present on the switching element is arranged in parallel with the switching element. During a dead time, where the primary winding of the activation transformer is then connected to ground potential via the switching elements of the clamping circuits, in the case of a positive voltage, and via the limiting elements in the case of a negative voltage.

In a preferred embodiment, the respective limiting element is a Schottky diode.

In a further embodiment, a smoothing element is arranged in each case between the blocking element and the output of the assigned CMOS driver. As a result, interfering oscillations are attenuated.

Such a smoothing element is a resistor in a simple embodiment.

The blocking element that is used in the respective clamping circuit to activate the switching element is favorably formed as a double diode. The falling flux voltage is then in any case sufficiently high to switch off the switching element.

In a further advantageous embodiment, the switching element is a PNP transistor, the base terminal and emitter terminal of which are interconnected via the blocking element, and the collector terminal of which is connected to the ground potential. A simple circuit arrangement is thus provided, which optimally fulfills the clamping function.

In another advantageous embodiment of the invention, the power bridge circuit comprises a half bridge, which is activated via two CMOS drivers. This configuration of a resonance converter is simple to dimension and suitable for high voltages with at the same time a minimal installation size.

The structure is simplified in that each CMOS driver is formed as an integrated series circuit of two MOSFETs. Such integrated CMOS drivers, on account of the inventive solution, can be dimensioned to be correspondingly small, which again has a positive effect on the installation size and the manufacturing costs of the resonance converter.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below by way of example with reference to the appended figures, in which.

DETAILED DESCRIPTION OF THE EXEMPLARY EMBODIMENTS

Figure 1:
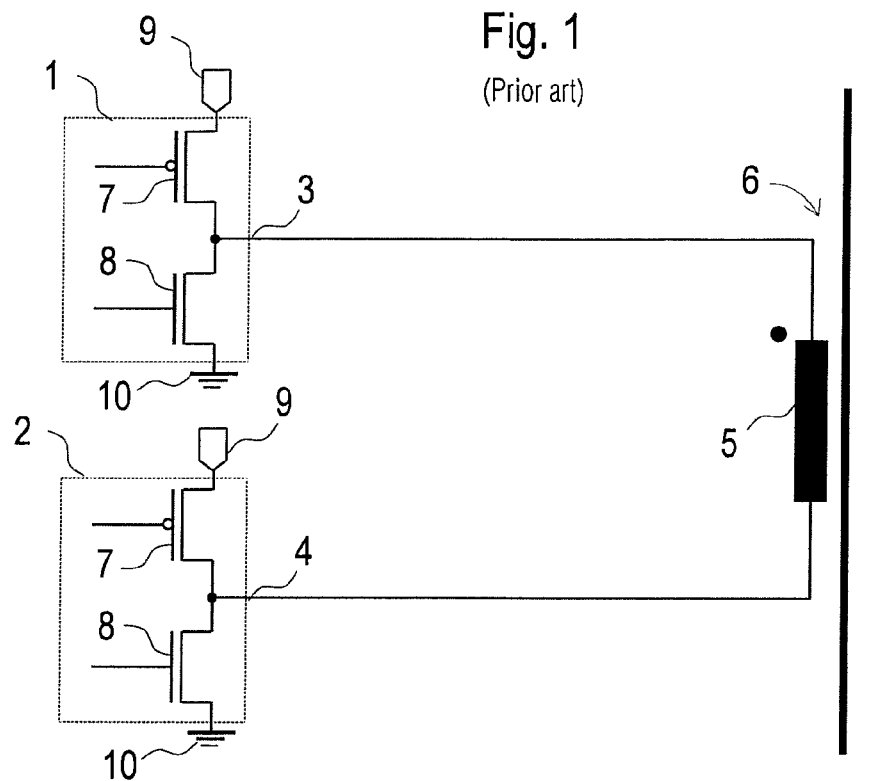
FIG. 1 shows a schematic representation of a primary side of an activation circuit in accordance with the prior art.

The primary side of a conventional activation circuit shown in FIG. 1 includes two CMOS drivers 1, 2, the outputs 3, 4 of which are interconnected via a primary winding 5 of an activation transformer 6. Each CMOS driver 1, 2 includes two MOSFETs 7, 8, where the first MOSFET 7 switches the respective driver output 3, 4 to a supply voltage 9 and the second MOSFET 8 switches the respective driver output 3, 4 to a ground potential 10.

Figure 2:
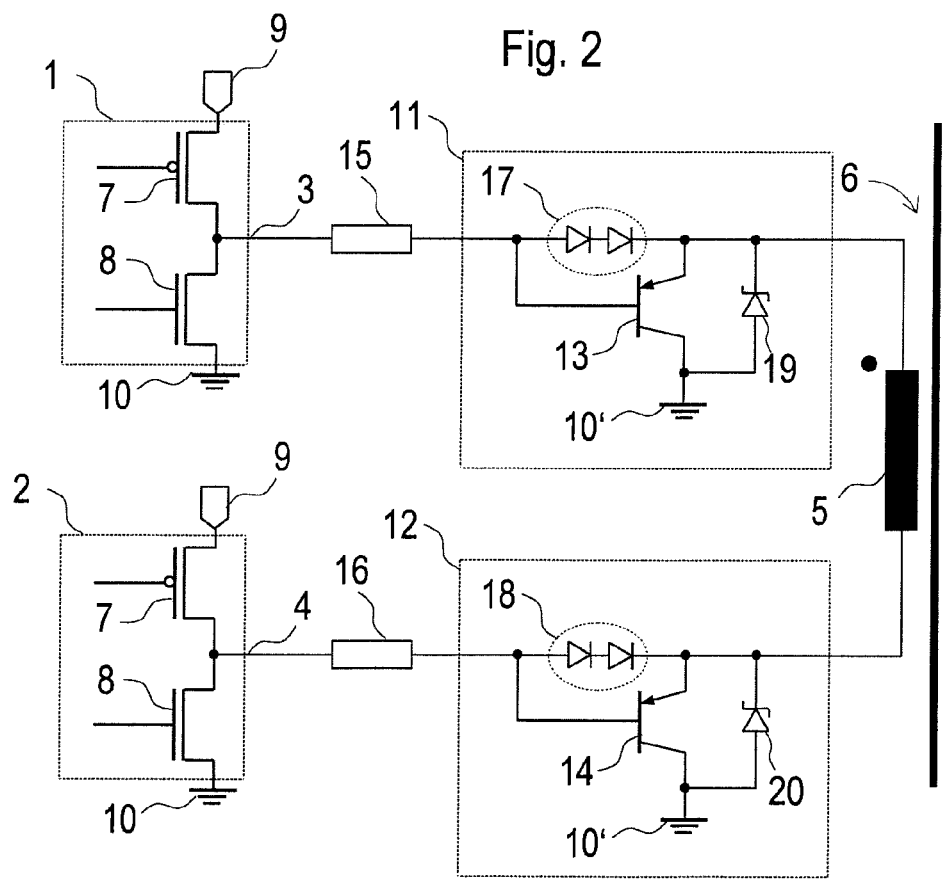
FIG. 2 shows a schematic representation of a primary side of an activation circuit with clamping circuits in accordance with the invention.

In order to avoid the problems of such a circuit mentioned in the introduction, a clamping circuit 11, 12 is arranged in accordance with the invention between each driver output 3, 4 and the respective terminal of the primary winding 5. An example is illustrated in FIG. 2.

Each clamping circuit 11, 12 includes a switching element 13, 14, such as a PNP transistor. The base terminal is present at the output of the assigned CMOS driver 1, 2, where a resistor is optionally interconnected as a smoothing element 15, 16. The emitter terminal is also connected to the connection between the driver output 3, 4 and primary winding 5. A blocking element 17, 18 is, however, arranged between the base terminal and emitter terminal to control the switching element 13, 14, which is conducting in the direction of the emitter terminal and blocks in the direction of the base terminal. If in the conducting state a current flows through the blocking element 17, 18, a flux voltage falls, which switches off the assigned switching element 13, 14.

Conversely, the respective switching element 13, 14 is then always switched on if the assigned blocking element 17, 18 blocks, in other words in the case of a power reflow. This is the case during a dead time. Here, the switched-on switching element 13, 14 causes the primary winding 5 to be clamped against the ground potential 10' present at the collector terminal. This may be the same ground potential 10 to which the CMOS drivers 1, 2 are connected. There is, however, also the possibility of applying another potential.

In order to provide a sufficiently high switching voltage, it is favorable if the respective blocking element 17, 18 comprises a double diode.

In order to limit a negative voltage during a dead time, a limiting element 19, 20 is arranged in each clamping circuit parallel to the emitter and collector terminal of the switching element 13, 14, such as a Schottky diode.

Figure 3:
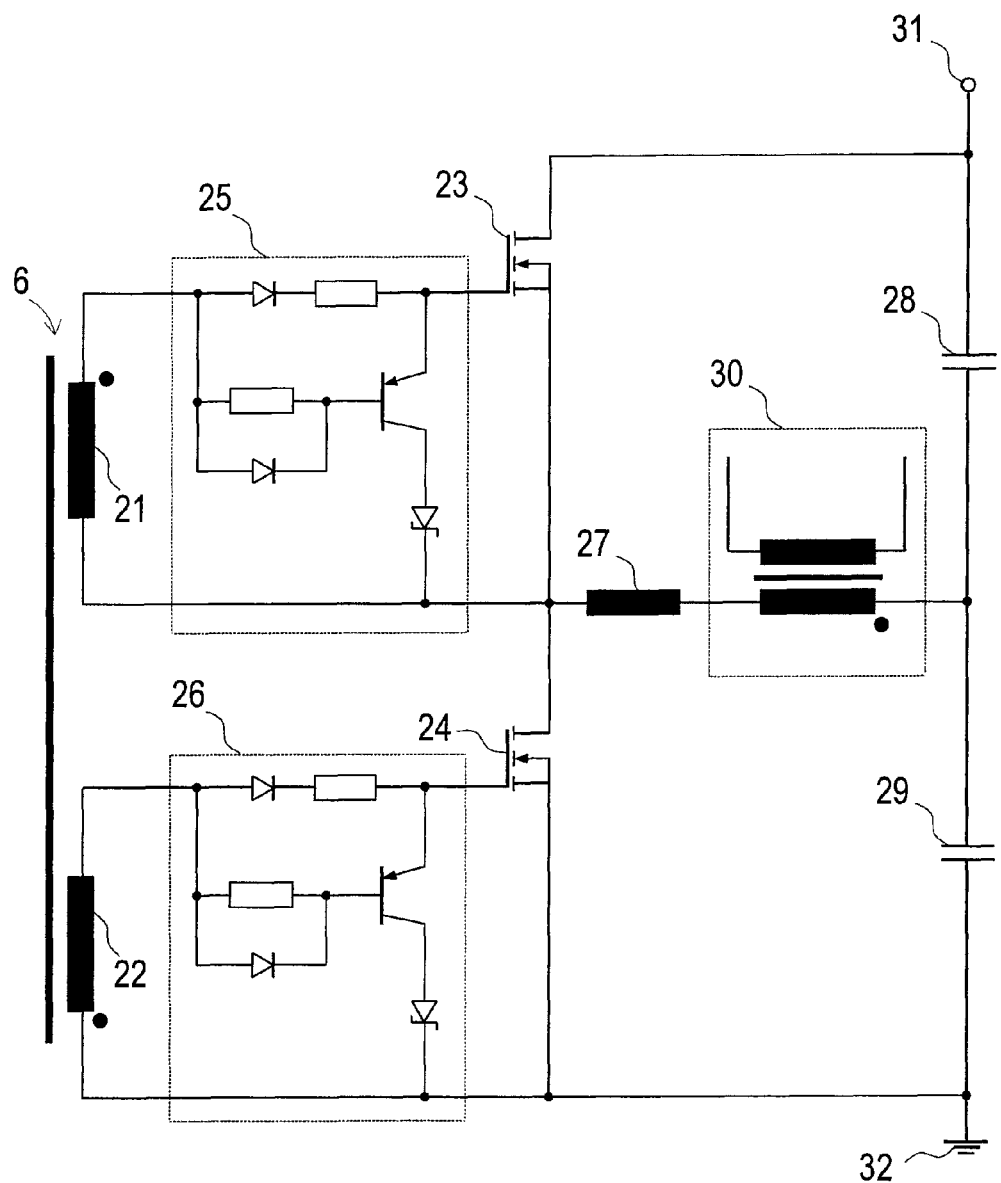
FIG. 3 shows a schematic representation of a secondary side of an activation circuit with a power half bridge in accordance with the invention.

The secondary side of the activation transformer 6 shown in FIG. 3 includes two secondary windings 21, 22 which are wound mirror-inverted. The gate signal for the upper-power half-bridge half (high side) is transferred via the upper secondary winding 21. The gate signal for the lower-power half-bridge half (low side) is transferred with the lower secondary winding 22.

On account of the mirror-inverted winding, the circuit breakers 23, 24 are switched on and off in a mirror-inverted manner. Both circuit breakers 23, 24 are switched off during the dead time prior to a switchover process.

For secondary-side demagnetization during a dead time, suitable auxiliary circuits 25, 26 are arranged between the secondary windings 21, 22 and the circuit breakers 23, 24.

The power circuit further includes a resonance inductance 27, resonance condensers 28, 29 and a resonance transformer 30. An input voltage 31 related to a secondary side potential 32 is transferred to a secondary side of the resonance transformer 30 via this element.

The activation circuit with the clamping circuits 11, 12 has the following mode of operation. Energy from the CMOS drivers 1, 2 flows firstly in the direction of the power half bridge on the primary side of the activation transformer 6. A current flow runs precisely from the output of the upper CMOS driver 1 (high-side driver) via the upper smoothing element 15, the conducting blocking element 17 of the clamping circuit 11, the primary winding 5 and the switching element 14 of the lower clamping circuit 12 to the ground potential 10'. Here, the switching element 13 of the upper clamping circuit 11 is switched off by the flux voltage of the conducting blocking element 17.

Positive and negative pulses cause a simultaneous switching-on and blocking of the power half-bridge on the secondary side of the activation transformer 6.

A dead time is provided at the end of each pulse. An energy flow from the secondary side to the primary side of the activation transformer 6 takes place, here. Both CMOS driver outputs 3, 4 are present here on the ground potential 10, and therefore output a low signal. Both base terminals of the switching elements 13, 14 of the clamping circuits 11, 12 are thus connected to the ground potential 10 via the CMOS driver 1, 2. A positive voltage present on the respective clamping circuit 11, 12 then amplifies the base current of the respective switching element 13, 14. The collector current clamps the primary winding against the ground potential 10'.

With a negative voltage, the corresponding limiting element 19, 20 is conducting and in this way brings about voltage limiting.

With a reversal of the current flow during a subsequent pulse, the current flows from the output of the lower CMOS driver 2 (low-side driver) via the lower smoothing element 16, the conducting blocking element 18 of the lower clamping circuit 12, the primary winding 5 and the switching element 13 of the upper clamping circuit 11 to the ground potential 10'. Here, the switching element 14 of the lower clamping circuit 12 is switched off via the flux voltage of the conducting blocking element 18.

Both winding terminals of the primary winding 5 of the activation transformer 6 are thus connected in each instance alternately by the upper and the lower clamping circuit to the ground potential 10'.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An activation circuit for activating a power bridge circuit of a resonance converter, comprising:
   a plurality of CMOS drivers;
   an inductive activation transformer which transfers a pulsed control signal generated via the plurality of CMOS drivers to the power bridge circuit;
   a clamping circuit arranged at an output of each CMOS driver of said plurality of CMOS drivers, said clamping circuit clamping a primary winding of the inductive activation transformer to a ground potential during a dead time between two pulses of the pulsed control signal.

2. The activation circuit according to claim 1, wherein the clamping circuit at the output of each CMOS driver of said plurality of CMOS drivers includes a blocking element arranged in a connecting line between the output of an assigned CMOS driver and a terminal of a primary winding of the inductive activation transformer, the connecting line being connected to the ground potential via a switching element;
   wherein the switching element is activated via a flux voltage which is falling at the blocking element in a conducting state, such that the switching element is switched off with a conducting blocking element.

3. The activation circuit as claimed in claim 2, further comprising:
   a limiting element arranged in parallel to the switching element to limit a negative voltage applied to the switching element.

4. The activation circuit as claimed in claim 3, wherein the limiting element is a Schottky diode.

5. The activation circuit as claimed in claim 4, further comprising:
   a smoothing element arranged between the blocking element and the output of the assigned CMOS driver.

6. The activation circuit as claimed in claim 3, further comprising:
   a smoothing element arranged between the blocking element and the output of the assigned CMOS driver.

7. The activation circuit as claimed in claim 2, further comprising:
   a smoothing element arranged between the blocking element and the output of the assigned CMOS driver.

8. The activation circuit as claimed in claim 7, wherein the smoothing element is a resistor.

9. The activation circuit as claimed in claim 2, wherein the blocking element comprises a double diode.

10. The activation circuit as claimed in claim 2, wherein the switching element is a PNP transistor having a base terminal and an emitter terminal which are interconnected via the blocking element, the PNP transistor further having a collector terminal which is connected to the ground potential.

11. The activation circuit as claimed in claim 1, wherein the power bridge circuit comprises a half bridge which is activated via the plurality of CMOS drivers.

12. The activation circuit as claimed in claim 1, wherein each CMOS driver of the plurality of CMOS drivers comprises an integrated series circuit of a plurality of MOSFETs.

* * * * *